E. T. FOOTE.
BATTERY CHARGING EQUIPMENT.
APPLICATION FILED FEB. 19, 1916.
1,227,771.
Patented May 29, 1917.
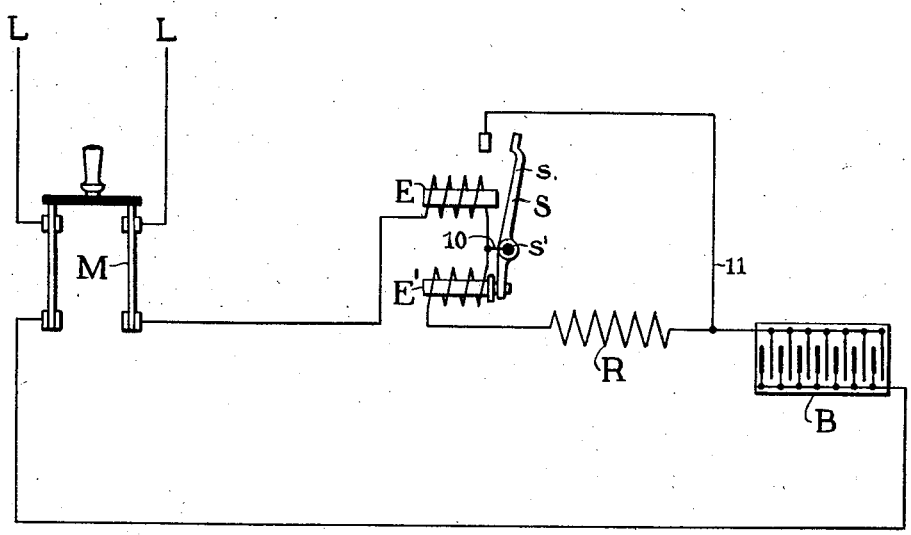
Inventor
Edward T. Foote
By Frank... Hubbard
Attorney

UNITED STATES PATENT OFFICE.

EDWARD T. FOOTE, OF MONTCLAIR, NEW JERSEY, ASSIGNOR TO THE CUTLER-HAMMER MFG. CO., OF MILWAUKEE, WISCONSIN, A CORPORATION OF WISCONSIN.

BATTERY-CHARGING EQUIPMENT.

1,227,771.     Specification of Letters Patent.     Patented May 29, 1917.

Application filed February 19, 1916. Serial No. 79,435.

*To all whom it may concern:*

Be it known that I, EDWARD T. FOOTE, a citizen of the United States, residing at Montclair, in the county of Essex and State of New Jersey, have invented new and useful Improvements in Battery-Charging Equipment, of which the following is a full, clear, concise, and exact description, reference being had to the accompanying drawing, forming a part of this specification.

This invention relates to improvements in battery charging equipment and more particularly to means for charging batteries by the "across the line" or "constant potential" method.

One of the objects of the invention is to provide a battery charging equipment having automatic regulating means to restrict the initial surge of current through the battery circuit upon completion thereof and to thereafter under predetermined conditions, relieve said circuit of its restrictive effect.

Other objects and advantages will hereinafter appear.

The accompanying sheet of drawing illustrates diagrammatically one form which the invention may take in practice.

Referring to the drawing, battery B is shown as initially connected across the line L—L' for charging, the continuity of its circuit being controlled by a switch M. A resistance R is included in series with battery B for reducing the initial surge of current therethrough to a desirable value and a so-called "lockout" switch S is provided to automatically exclude said resistance under certain electrical conditions.

The switch S operates on well-known principles. Two electromagnets E and E' are provided for exerting opposite pulls on the switch arm *s* which is pivoted at *s'* and biased to open position by gravity or otherwise. An electrical conductor 10 is connected to the main line between the windings of the two electro-magnets E and E', and extends to the pivot *s'* of switch S, while a second conductor 11 extends from the stationary contact of said switch back to the main line at a point between resistance R and battery B, thereby providing a short-circuit around resistance R and electromagnet E' upon closure of switch S.

The relation of said electromagnets is such that under normal current conditions in the battery circuit the magnet E predominates to close the switch while during a high or excessive flow of current the magnet E' predominates to hold the switch open.

The switch S being biased to open position, the course of the current upon closing circuit across the line through switch M will be through both electromagnets E and E' and resistance R to the battery. The initial flow of current is heavy since the battery at first offers relatively slight resistance thereto. Under these conditions electromagnet E' predominates thereby holding switch S open and retaining resistance R in series with the battery for restricting the flow of current. However, as the internal resistance of the battery builds up the flow of current is automatically reduced and at predetermined current reduction the electromagnet E predominates to close switch S thereby excluding both resistance R and the winding of electromagnet E' from the battery circuit. The course of the current thereafter being from electromagnet E through conductor 10, switch arm S and conductor 11 back to the line. Thus the battery is initially fully protected against excessive current and is thereafter automatically given full charging current as soon as its condition warrants the same.

As pointed out, the switch S in closing short-circuits its winding E' and accordingly this winding will be ineffective to interfere with the retention of the switch in closed position. Also, as above noted, the switch S is biased to open position and hence it will interrupt the short-circuit around the resistance R immediately upon interruption of the battery circuit and consequently deënergization of winding E. Thus inclusion of the resistance upon initial closure of circuit is always insured.

What I claim as new and desire to secure by Letters Patent is:

1. In combination, a battery, a source of current for charging the same, a resistance normally included in circuit with said battery and an electro-responsive switch to automatically exclude said resistance from circuit, said switch being self locking against response thereof under predetermined current conditions and being subjected to control by the current of the battery circuit.

2. In combination, a battery, a source of current for charging the same, a resistance, means to connect said battery to said source of current through said resistance and an electro-responsive switch self locking against response thereof under certain current conditions and subjected to the current of the battery circuit for timing of its response, said switch upon responding acting to shunt said resistance and being subject to deënergization upon disconnection of said battery from said source of current thereby insuring inclusion of said resistance upon subsequent initial connection of said battery to said source of current.

3. In combination, a battery, a source of current for charging the same, a resistance, a shunting switch for said resistance having an operating winding and a lockout winding, the latter winding being provided for series connection with said battery and means to connect said battery to said source of current through said resistance and said lockout winding of said switch and to further complete the circuit of the operating winding of said switch whereby said switch is rendered effective under certain current conditions to automatically shunt said resistance.

4. In a battery charging equipment, in combination, a line for supplying current, a battery connected thereto, a resistance included in series with said battery for limiting the initial surge of current therethrough, and an electro-responsive switch for excluding said resistance from said circuit, said switch having two windings included in series with said battery, one to actuate the same and the other to hold it against actuation while the current in the battery exceeds a predetermined value.

5. In a battery charging equipment, in combination, a current supplying line, a battery connected thereacross, a resistance included in series with said battery, and an electro-responsive switch biased to open position, said switch having two windings connected in series with said battery and with each other for exerting opposite pulls upon said switch, one of said windings predominating during excessive current conditions to maintain said switch open thereby maintaining said resistance in circuit, and the other of said windings predominating during normal current conditions to close said switch and exclude both said resistance and said first mentioned winding from the battery circuit.

In witness whereof, I have hereunto subscribed my name.

EDWARD T. FOOTE.